UNITED STATES PATENT OFFICE.

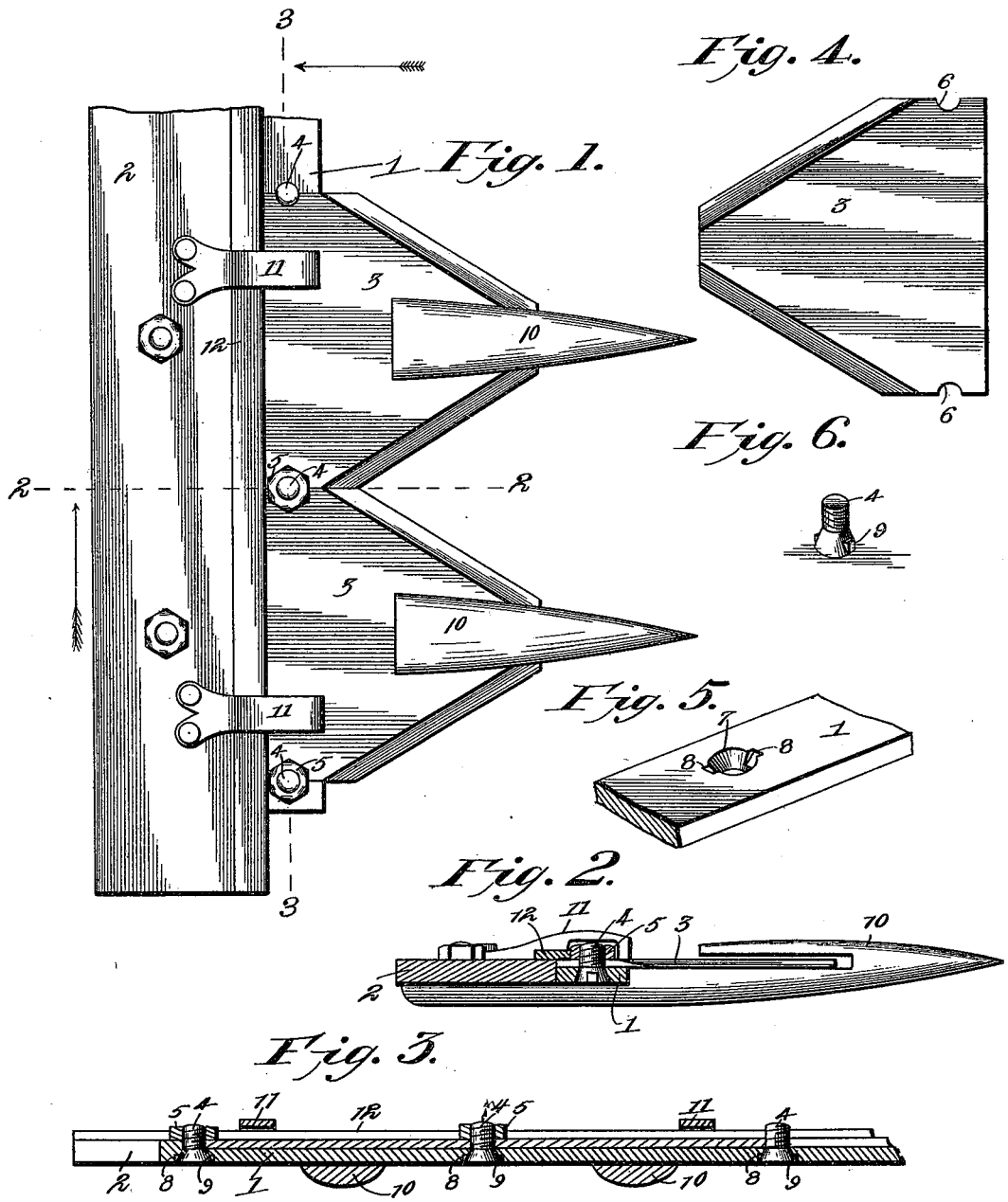

EDWIN ROBLIN, OF BELLEVILLE, CANADA.

CUTTING APPARATUS FOR REAPING OR MOWING MACHINES.

SPECIFICATION forming part of Letters Patent No. 643,684, dated February 20, 1900.

Application filed August 1, 1899. Serial No. 725,821. (No model.)

*To all whom it may concern:*

Be it known that I, EDWIN ROBLIN, gentleman, of the city of Belleville, in the county of Hastings, in the Province of Ontario, Canada, have invented certain new and useful Improvements in Cutting Apparatus for Reaping or Mowing Machines; and I do hereby declare that the following is a full, clear, and exact description of the same.

The invention relates to improvements in cutting apparatus for reaping and mowing machines.

The object of the present invention is to improve the construction of cutting apparatus for reaping and mowing machines and to provide a simple, inexpensive, and efficient one which will possess great strength, durability, and lightness and which will enable the blades of the cutter-bar to be taken off and put on in a convenient, easy, and quick manner.

A further object of the invention is to provide a cutting apparatus of this character in which the nuts of the cutter-bar will be locked by a device mounted on the finger-bar, whereby the cutter-bar will be relieved of the weight of such device and to enable the locking device to operate also as a continuous bearing for the rear edge of the cutter-bar to prevent the latter from rocking on the finger-bar.

The invention consists in the construction and novel combination and arrangement of parts hereinafter fully described, illustrated in the accompanying drawings, and pointed out in the claim hereto appended.

In the drawings, Figure 1 is a plan view of a portion of a cutting apparatus constructed in accordance with this invention. Fig. 2 is a transverse sectional view on line 2 2 of Fig. 1. Fig. 3 is a detail longitudinal sectional view on line 3 3 of Fig. 1. Fig. 4 is a detail view of one of the blades. Fig. 5 is a detail view of a portion of the cutter-bar, showing one of the notched countersunk perforations. Fig. 6 is a detail perspective view of one of the bolts.

Like numerals of reference designate corresponding parts in all the figures of the drawings.

1 designates a reciprocating cutter-bar mounted on a finger-bar 2 and having blades 3 detachably secured to it by means of bolts 4 and nuts 5. The blades are provided at their side edges with corresponding recesses 6, forming circular openings which register with corresponding bolt-openings 7 of the cutter-bar. The bolt-openings 7 of the cutter-bar are flared or countersunk at the lower face of the same to receive the heads of the bolts, and they are provided at opposite sides with notches 8, which are engaged by corresponding lugs 9, located at opposite sides of the heads of the bolts and adapted to prevent the same from rotating when the nuts are screwed tightly against the upper faces of the blades. The blades have straight side edges, as clearly illustrated in Fig. 4 of the drawings, and the nuts which engage their outer faces span the edges and hold the blades tightly against the cutter-bar. As the nuts are of sufficient size to project considerably beyond the recesses of the blades the latter are not weakened materially and are firmly held in position. This arrangement also permits the blades to be readily removed and replaced by simply removing one of the nuts at one side of the blade to be removed and loosening the nut at the opposite side. This may be accomplished without removing the cutter-bar from the cutting apparatus.

The finger-bar is provided with suitable guard-fingers 10, and it has keepers 11, arranged at intervals and extending over the cutter-bar in the usual manner, and these keepers also serve to clamp a locking-bar 12 in position at the back of the cutter-bar. The locking-bar, which is adjusted by means of the keepers 11, overhangs the rear edges of the blades and has its front edge located adjacent to the nuts. The locking-bar is separated from the nuts a sufficient distance to permit them to clear it, but it is adapted to be engaged by the same to prevent them from accidentally unscrewing. Besides performing the functions of a nut-lock the locking-bar by projecting over the rear edges of the blades affords a continuous bearing for the same and prevents the cutter-bar from rocking on the finger-bar.

It will be seen that the blades are detachably secured to the cutter-bar by means of bolts and nuts without materially weakening them, that they may be quickly and conveniently removed and replaced when it is necessary to grind them or to replace a broken blade by a new one, and that as they may be removed and ground separately there is no liability of concaving the sections and spoiling the point. It will also be clear that the locking-bar, which is adjustably secured to the finger-bar at the back of the blades, not only prevents the nuts from accidentally unscrewing, but also affords a continuous bearing for the rear edges of the blades to prevent the cutting-bar from rocking on the finger-bar. Also by mounting the locking device on the finger-bar the movable cutter-bar is not subjected to the weight of the same and is enabled to reciprocate with less friction and to operate with greater efficiency than would be the case were the locking-bar carried by the cutter-bar. Also the improved cutting apparatus possesses great simplicity, strength, durability, and lightness and at the same time the parts are easily and cheaply manufactured.

Another advantage of the invention is that the locking-bar 12 by extending over the rear edges of the blades forms a shield for excluding the juices of grass and the like from the rear edge of the cutter-bar to prevent the latter from becoming gummed and to avoid any increased friction from such source.

What is claimed is—

In a cutting apparatus of the class described, the combination with a cutter-bar, blades arranged on the same, and bolts securing the blades to the cutter-bar and provided at the upper faces of the former with nuts, of a locking-bar arranged at the back of the nuts to lock the same against rotation and extending beyond the rear ends of the blades to overlap the joint, substantially as described.

Belleville, May 27, 1899.

EDWIN ROBLIN.

In presence of—
R. W. ADAMS,
M. E. McCARTHY.